J. W. ANDERSON.
LUBRICATING AXLE FOR TROLLEY WHEELS.
APPLICATION FILED JULY 28, 1913.

1,104,952.

Patented July 28, 1914.

Witnesses.
Hertie Nicholson
Ernest Smith

Inventor.
John W. Anderson
By Alfred T. Bratton
Attorney.

UNITED STATES PATENT OFFICE.

JOHN W. ANDERSON, OF HAMILTON, ONTARIO, CANADA.

LUBRICATING-AXLE FOR TROLLEY-WHEELS.

1,104,952. Specification of Letters Patent. Patented July 28, 1914.

Application filed July 28, 1913. Serial No. 781,572.

*To all whom it may concern:*

Be it known that I, JOHN WILLIAM ANDERSON, a subject of the King of Great Britain, and a citizen of the Dominion of Canada, residing at 29 Hess street south, in the city of Hamilton, in the county of Wentworth, Province of Ontario, Dominion of Canada, have invented certain new and useful Improvements in Lubricating-Axles for Trolley-Wheels, of which the following is a specification.

This invention relates to trolley or collector wheels for electricity and it has more particular reference to such wheels as are employed on electric railroads. Trolley wheels of the kind referred to are in many instances built up in several sections which may be easily disconnected one from the other to permit of the insertion of a new tread.

The object of the invention is to provide a trolley wheel adapted to carry a quantity of lubricant which is automatically and efficiently fed to the rotary tread.

With this and other objects in view, my invention consists in the novel construction, arrangement and combination of parts hereinafter more fully described, illustrated by the accompanying sheet of drawings, and more particularly pointed out by the appended claim.

Figure 1:
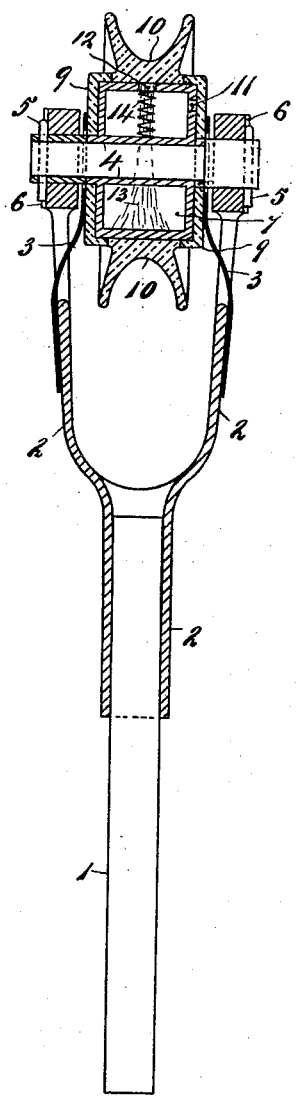
Figure 2:
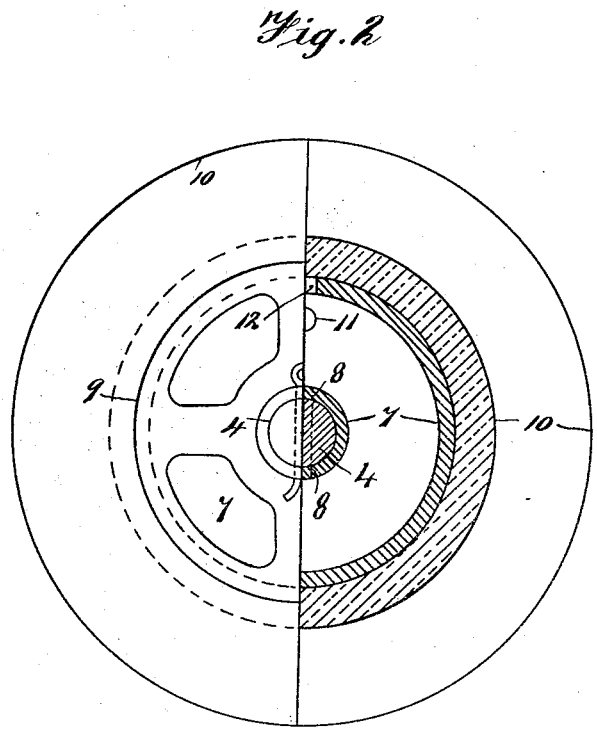

In the drawings, Figure 1, is an axial longitudinal section through a trolley-wheel and harp head for electric railroads embodying my improvements. Fig. 2, is an enlarged detail side elevation of the trolley-wheel detached from the harp, the right-hand half being in section to better illustrate the invention.

According to the form of my invention illustrated, 1, is the conductor rod which is appropriately riveted or otherwise securely fixed in the outer end of the trolley-arm or pole.

2, is the harp and 3, 3, the conductor springs secured to said harp 2, in any of the well known ways.

4, is the axle or spindle for the trolley-wheel, and it is according to my invention as illustrated securely prevented from rotation in the harp 2, by split or cotter-pins 5, 5, engaging in grooves 6, 6, formed therein for their reception and retention.

7 is a cylindrical container for lubricant of any appropriate nature and it is integral with the aforesaid spindle 4 and since the cotter pins 5 hold spindle 4 against rotation it is apparent that the container 7 is likewise held against rotation.

9, 9 are washers or recessed disks freely revoluble on the outer faces of the aforesaid cylindrical lubricant container, and 10, is the detachable or removable tread. It is to be particularly noted that the washers 9, 9, serve to keep the tread 10, in position and serve as conductors from said tread to the conductor springs 3, 3; while at the same time they in conjunction with the springs 3, 3, allow of the tread 10, to move longitudinally of its axis when taking curves in the track without fear of the current being interrupted. This feature will be self evident to all those acquainted with the art to which my invention appertains, and it will also be observed that the washers 9, 9, prevent the tread 10, from riding over in either direction into contact with harp 2.

11, is the filling aperture.

12, is the feed hole for the lubricant from the container 7, to the loose thread 10, and it is conveniently fitted with a wick 13, held in place by a spring 14. It will thus be seen that the lubricant in the container 7, is automatically fed—lamp fashion—to the feed hole 12, a very desirable feature in connection with trolley-wheels of the nature referred to.

From the foregoing description it will be readily seen that by my invention I provide an extremely simple and very effective trolley-wheel, the tread whereof can be expeditiously removed and replaced by a new one. Furthermore perfect lubrication is absolutely insured by the wick means described. Finally I do not limit myself specifically to the precise arrangement and proportions of parts above outlined and illustrated, changes therein being obvious without in any way departing from the spirit and scope of my invention.

Having thus described my invention, what I claim as new and desire to secure by Letters Patent, is:—

In a device of the character described the combination with a fixed shaft of a central hollow cylindrical member, cup like washers surrounding said shaft embracing the opposite ends of said cylindrical member, a flared tread portion mounted both for rotation and axial sliding movement upon said member, a harp and springs bearing between said washers and a part of said harp.

Signed at Hamilton, county of Wentworth, Province of Ontario, Canada, this 21st day of July, A. D. 1913.

JOHN W. ANDERSON.

In the presence of—
 ALFRED T. BRATTON,
 GERTIE NICHOLSON.

Copies of this patent may be obtained for five cents each, by addressing the "Commissioner of Patents, Washington, D. C."